(12) United States Patent
Mühl et al.

(10) Patent No.: US 11,964,913 B2
(45) Date of Patent: Apr. 23, 2024

(54) INSULATION PANEL

(71) Applicant: MÜHL ENGINEERING SYSTEMS GMBH, Grünwald (DE)

(72) Inventors: Christian Mühl, Harz (DE); Arthur Oswald, Paderborn (DE); Wolfgang Bremser, Paderborn (DE)

(73) Assignee: MÜHL ENGINEERING SYSTEMS GMBH, Grünwald (DE)

( * ) Notice: Subject to any disclaimer, the term of this patent is extended or adjusted under 35 U.S.C. 154(b) by 881 days.

(21) Appl. No.: 16/965,093

(22) PCT Filed: Nov. 28, 2018

(86) PCT No.: PCT/EP2018/082882
§ 371 (c)(1),
(2) Date: Jul. 27, 2020

(87) PCT Pub. No.: WO2019/145070
PCT Pub. Date: Aug. 1, 2019

(65) Prior Publication Data
US 2021/0024419 A1    Jan. 28, 2021

(30) Foreign Application Priority Data
Jan. 26, 2018 (EP) ...................... 18153712

(51) Int. Cl.
| | | |
|---|---|---|
| C04B 28/24 | (2006.01) | |
| B32B 3/12 | (2006.01) | |
| B32B 18/00 | (2006.01) | |
| B32B 19/06 | (2006.01) | |
| C01B 33/44 | (2006.01) | |
| C04B 20/06 | (2006.01) | |
| C04B 38/00 | (2006.01) | |
| C04B 111/00 | (2006.01) | |

(52) U.S. Cl.
CPC ............... *C04B 28/24* (2013.01); *B32B 3/12* (2013.01); *B32B 18/00* (2013.01); *B32B 19/06* (2013.01); *C01B 33/44* (2013.01); *C04B 20/06* (2013.01); *C04B 38/0083* (2013.01); *B32B 2307/102* (2013.01); *B32B 2307/304* (2013.01); *B32B 2307/3065* (2013.01); *B32B 2307/73* (2013.01); *B32B 2315/02* (2013.01); *C04B 2111/00612* (2013.01)

(58) Field of Classification Search
CPC ..... B32B 3/12; B32B 18/00; B32B 2307/102; B32B 2307/3065; B32B 2315/02; C04B 28/24; C01B 33/44
See application file for complete search history.

(56) References Cited

U.S. PATENT DOCUMENTS

| | | | |
|---|---|---|---|
| 4,269,628 A | 5/1981 | Ballard et al. | |
| 4,800,041 A | 1/1989 | Tymon et al. | |
| 5,309,690 A * | 5/1994 | Symons | B32B 5/02 428/116 |
| 5,830,319 A | 11/1998 | Landin | |
| 2004/0183051 A1 | 9/2004 | Wenzel et al. | |
| 2009/0014691 A1 | 1/2009 | Kint et al. | |
| 2011/0079746 A1 | 4/2011 | Fernando et al. | |
| 2016/0075862 A1 | 3/2016 | Kenig | |
| 2017/0152190 A1 | 6/2017 | Ko | |
| 2020/0062661 A1* | 2/2020 | Geisler | C04B 41/71 |

FOREIGN PATENT DOCUMENTS

| | | |
|---|---|---|
| CN | 1508069 A | 6/2004 |
| EP | 0009310 A1 | 4/1980 |
| EP | 0016659 A1 | 10/1980 |
| EP | 0312954 A2 | 4/1989 |
| EP | 0212930 B1 | 11/1994 |
| FR | 1101775 A | 10/1955 |
| GB | 1591801 A | 6/1981 |
| GB | 1593383 A | 7/1981 |
| JP | 2004269292 A | 9/2004 |
| WO | 2007050536 A1 | 5/2007 |
| WO | 2015179221 A1 | 11/2015 |

OTHER PUBLICATIONS

Li et al. "Preparation of mesoporous calcium doped silica spheres with narrow size dispersion and their drug loading and degradation behavior"; Microporous and Mesoporous Materials; 102, 2007, pp. 151-158.
Caroline Minker-Villemin et al. "Preparation and properties of potassium-vermiculite films"; Journal of Materials Research, vol. 13, issue 1, 1998, pp. 228-236.
Ballard et al. "Flexible inorganic films and coatings"; Journal of Materials Science, vol. 18, Issue 2, 1983, pp. 545-561.
Partial European Search Report issued for European Application No. 18153712, dated Apr. 6, 2018, 7 pages.
International Search Report and Written Opinion in PCT/EP2018/082882, dated Feb. 28, 2019. 23 pages.
Mark O. Losego et al: "Ultralow Thermal Conductivity in Organoclay Nanolaminates Synthesized via Simple Self-Assembly", Nano Letters, vol. 13, No. 5, May 8, 2013 (May 8, 2013), pp. 2215-2219, XP055462636.
Extended European search report in 18153712.7-1105, dated Jul. 18, 2017. 14 pages.
First Office Action, dated Jan. 4, 2023, issued in Chinese Application No. 2018800876657 and English translation. 13 pages.
Search Report, dated Dec. 26, 2022, issued in Chinese Application No. 2018800876657 and English translation. 6 pages.
Office Action dated Jul. 20, 2023, in Chinese Application No. 201880087665.7.
Prem Krishna, "Suspension Roofs," Hohai University Press, p. 285 (1992).

\* cited by examiner

*Primary Examiner* — Jeffrey C Mullis
(74) *Attorney, Agent, or Firm* — Meunier Carlin & Curfman LLC

(57) ABSTRACT

Insulation panel made from an insulation panel precursor comprising at least one modified layered silicate.

23 Claims, 6 Drawing Sheets

Figure 4 A (top) and B (bottom)

INSULATION PANEL

CROSS-REFERENCE TO RELATED APPLICATIONS

This application is a United States National Phase Patent Application of International Patent Application Number PCT/EP2018/082882, filed on Nov. 28, 2018, which claims the benefit of priority to EP Application No. 18.153712.7, filed Jan. 26, 2018.

Figure 1:
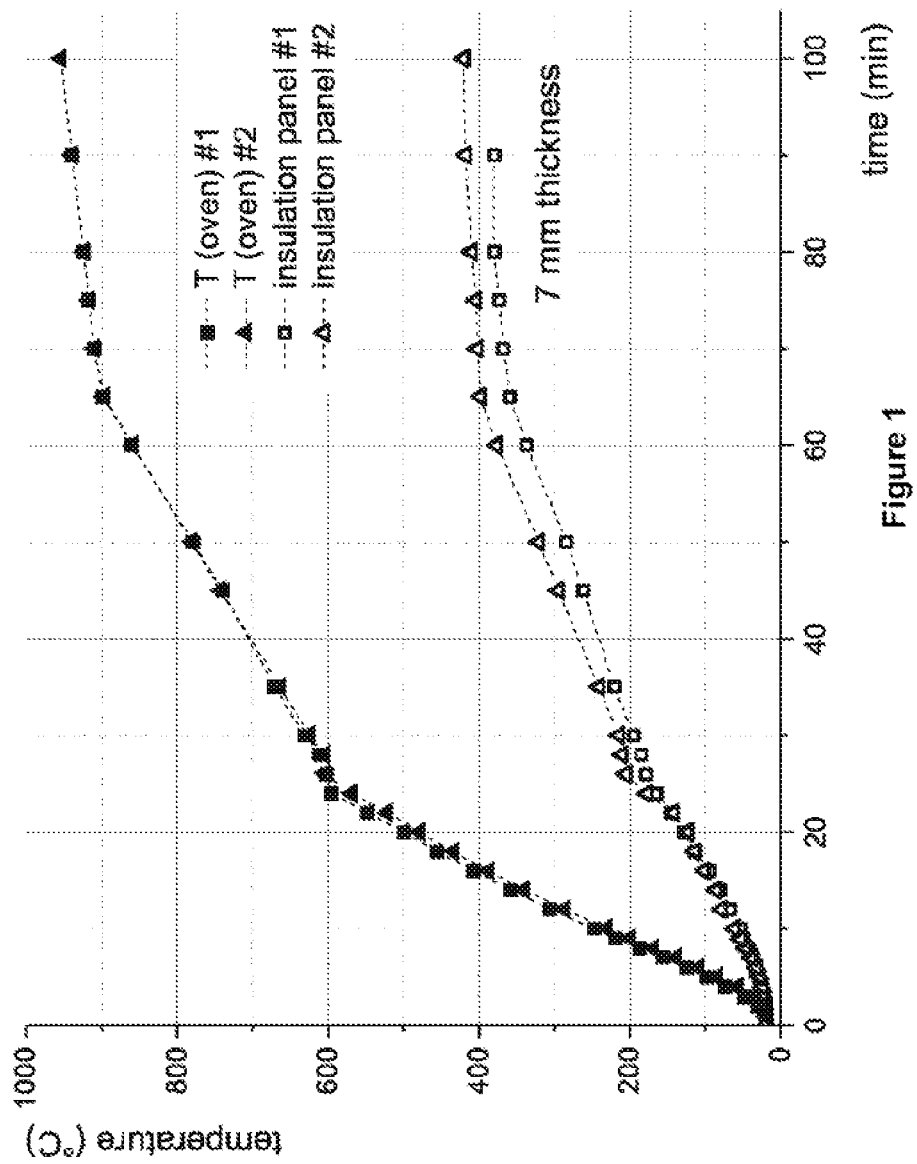
FIG. 1 depicts a temperature profile in the oven of the 7 mm thick insulation panels No. 1 and 2.

Thermal insulation is the reduction of heat transfer between objects in thermal contact or in the range of radiative influence. It can be achieved with specifically engineered methods or processes as well as suitable materials. The insulating capability of a material is measured with thermal conductivity, while low thermal conductivity is equivalent to high insulating capability. Gases possess poor thermal conduction properties compared to liquids and solids and thus make a good insulation material. In order to further augment the effectiveness of a gas (such as air) as insulation material, it may be disrupted into small cells, which cannot effectively transfer heat by natural convection. Convection involves a larger bulk flow of gas driven by buoyancy and temperature differences and does not work well in small cells where there is little density difference to drive it.

In order to accomplish gas cell formation in man-made thermal insulation, glass and polymer materials can be used to trap air in a foam-like structure. This principle is industrially used in building and piping insulations, such as glass wool, rock wool, polystyrene foam, polyurethane foam, perlite and cork. Great attention is directed to the insulation of buildings, since maintaining acceptable temperatures in buildings by heating and cooling requires an enormous share of the overall global energy consumption. In the past few years, enormous efforts were made to improve the properties of insulation materials and insulation building materials.

Organic insulation materials, such as polystyrene or polyurethane foams, are characterized by low weight and good insulation properties, whereas these materials are relatively easily inflammable and can thus only be used for the insulation of buildings to a limited extent. Particularly in higher buildings, such materials cannot be used for fire safety reasons. On the other hand, inorganic insulation materials, such as mineral wool, glass wool or asbestos, bear a high fire resistance, but have a high specific weight, i.e. the mass for achieving a predetermined insulation capability is relatively high, and are suspected to be toxic, since the fibers might be respirable and are believed to cause cancer.

The insulation material for construction purposes is usually prepared in so-called insulation panels, which provide for an easy handling of the insulation materials at the construction site. It is differentiated between integral insulation panels, wherein the panel is completely made of the insulation material, such as polystyrene panels, and so-called sandwich panels, wherein the insulation material is inserted between two relatively thin skin layers, which allow achieving better mechanical performance at reasonable weight.

Layered silicates are formed of planes of corner-connected $SiO_4$ tetrahedrons while the planes are not linked to each other by covalent SiO bonds, but electrostatically by interlayer ions, mostly cations. Layered silicates only have limited application in heat insulation materials. Some applications in this field are known for vermiculite, which undergoes significant expansion when subjected to heat, thereby forming submicroscopic voids that may hinder heat convection. To prepare insulation members, vermiculite is usually mixed with inorganic bonding agents, such as sodium silicate, and subsequently hydraulically pressed and heat treated into the desired shape. Such materials have only limited heat insulation properties due to their very compact structure.

In organically modified layered silicates, the cations in the intermediate layers are usually replaced by organic cations, such as organic ammonium compounds. Organically modified layered silicates are more compatible with organic compounds than unmodified layered silicates and are mainly used as fillers, e.g. in polymeric materials.

Minker-Villemin et al. describe the preparation and properties of flexible organically modified vermiculite films and investigate their dielectrical behavior (J. Mater. Res., vol. 13, no. 1, 1998).

Ballard et al. (Journal of Materials Science, vol. 18, 1983, pp. 545-561) deal with flexible films of organically modified phyllosilicates and the mechanical properties thereof. The film was also investigated as a coating of fibers.

U.S. Pat. No. 4,800,041 describes alkyl ammonium modified vermiculite and products made therefrom.

The present invention relates to new insulation materials, particularly insulation panels, which have good insulation properties while overcoming the known disadvantages, such as flammability, high specific weight and toxicity.

Thus, in a first aspect, the present invention relates to an insulation panel precursor comprising at least one modified layered mineral, particularly modified layered silicate.

In another preferred embodiment, the insulation panel precursor comprises at least one modified layered mineral, particularly modified layered silicate, and at least one fibrous component. The fibrous component may be of natural or synthetic origin. A preferred synthetic fibrous component may be a polyethylene, polypropylene, polyvinyl alcohol, polyester, polyamide, polyacrylnitril, polyvinylchloride, polyurethane, elastane, aramid, rubber, viscose, carbon, glass, and mineral fiber or carbon nanotubes. A preferred natural fibrous component is cellulose or its derivatives, cotton, bamboo, hemp, wool, silk, cocos or mineral fiber. Preferably, the fibrous component is a cellulose fiber or a cellulose derivative fiber.

The insulation panel precursor may comprise at least one spatial structure. Spatial structures are three-dimensional structures that may have at least one two-dimensional unit, such as linear members, e.g. sticks or columns, or plane members, e.g. films, e.g. connected to each other using pin or line connections.

In order to form a spatial structure, the at least one two-dimensional unit may be fixed or interconnected with an adhesive, more particularly an inorganic adhesive. Inorganic adhesives are known in the art and may be soluble in a solvent such as water and are capable of forming covalent three-dimensional structures after removal of the solvent. Suitable inorganic adhesives may be silicates, preferably alkali silicates, such as sodium, lithium or ammonium silicate, or phosphates.

The spatial structure can be in various forms, among others flat double-layer grid (FDLG), flat multi-layer grid, braced barrel vault or dome, corrugated film, honeycomb-like structure, trapezial corrugated, grid-like, pyramid-shaped, spherical and perpendicular spiral-shaped structure.

The insulation panel precursor and/or the spatial structure is preferably configured such that it includes cavities, preferably mechanically formed cavities, in particular closed cells and tubes. The cavities may be regularly distributed within the insulation panel precursor and/or the spatial structure. The insulation panel precursor may be configured such that cavities, e.g. closed cells or tubes, may be formed by suitably interconnecting two or more spatial structures.

In a preferred embodiment, the overall volume of the cavities is about 30-95%, more preferably 50-95%, even more preferably 70-90% or 60-80%, of the overall volume of the insulation panel precursor.

The closed cells preferably have a closed volume of about 1 $mm^3$ to 125 $cm^3$, preferably of about 30 $mm^3$ to 25 $cm^3$. The tube may be open or closed and may have a volume of 1 $mm^3$ to 2,000 $cm^3$, preferably 50 $mm^3$ to 1,500 $cm^3$.

The cavities in the insulation panel precursor and/or the spatial structure may be filled with at least one gas, such as air, or inert gas, such as nitrogen, carbon dioxide, helium, neon or argon, and/or with a foamed inorganic and/or organic insulation material, such as vermiculite foam, silicate foam, sulfate foam or high-performance polymer foams, such as polyamide imide (PAI), polyimide (PI), polyether ether ketone (PEEK) or polybenzimidazole (PBI) foam.

In a preferred embodiment, the cavity is at least partially filled with at least one inorganic foam, such as vermiculite foam. The vermiculite foam may be prepared by mixing aqueous vermiculite suspension at high shear rates or under gas-introduction (e.g. air) in a mixer, preferably in a planetary mixer. The aqueous vermiculite suspension preferably has a concentration of 5-15 wt.-% of vermiculite, such as vermiculite micron grade, based on the total mass of the suspension.

The cavities or the foam structure may at least partially be vacuumized.

In a preferred embodiment, the spatial structure has a thickness of from about 1 mm to about 20 cm, preferably from about 0.5 to 15 cm, even more preferred from 0.1 to 5 cm.

In a further preferred embodiment, the insulation panel precursor may comprise a plurality of different or equal spatial structures.

In another preferred embodiment, the insulation panel precursor has a thickness of from about 1 mm to about 40 cm, preferably from about 1 to 20 cm, even more preferred from 2 to 15 cm.

The spatial structure is preferably formed from modified layered minerals, such as layered silicates or layered double hydroxides, particularly from films made of modified layered minerals. The layered silicate may be at least one phyllosilicate, such as bentonite, clay, mica, serpentine or smectite. More particularly, the phyllosilicate may be vermiculite, montmorillonite, kaolinite, illite, and muscovite.

The layered silicate is modified, i.e. the naturally occurring anions or cations, which are interdisposed between the silicate layers, are replaced by organic or inorganic, preferably organic, anions or cations other than the original interlayer cations or anions. Thus, the modified layered silicate may be organically and/or inorganically, particularly organically, modified. In the latter case, the original interlayer cations or anions of the layered silicate are replaced by organocations or organoanions. In a preferred embodiment, the original interlayer cations of the layered silicate are replaced by organocations such as organic ammonium ions or organic phosphonium ions, particularly ammonium butane.

Modified layered silicates may be prepared by conventional techniques known in the art. Usually, the layered silicates are suspended in an aqueous medium in the presence of the ions to be exchanged by the original interlayer ions. This process may be conducted at temperatures above room temperature (20° C.), e.g. in the range of 25-100° C., more preferably 40-80° C., for about 10 min to about 4 h. For a better dispersion, shearing forces and cutting forces, e.g. using an ULTRA-TURRAX®, a pulper, a mixer or suitable mills, may be applied. The obtained suspension may be filtered and washed to remove the original interlayer cations and may then be resuspended in an aqueous medium or dried at elevated temperatures, such as 20-100° C., possibly under vacuum.

In a further aspect, the present invention relates to a process of preparing an insulation panel precursor described above, comprising the following steps:

(a) providing a dispersion comprising at least one modified layered silicate in at least one solvent,
(b) applying the dispersion obtained in step (a) onto a surface,
(c) at least partially removing the at least one solvent at temperatures of about −100 to +95° C. and/or reduced pressure to form a casting,
(d) taking the casting obtained after step (c) and
(e) optionally forming a spatial structure from the casting or castings obtained after step (d).

In step (a), a dispersion of at least one modified layered silicate is provided in at least one solvent, such as water, alkanols, such as ethanol, ketones, ester, ether, butyl acetate, 2-butanon, butyl glycol or mixtures thereof. The at least one modified layered silicate may be homogenized in the at least one solvent using shearing forces, e.g. using an ULTRA-TURRAX®, a pulper, a mixer or suitable mills. The dispersion may further comprise at least one fibrous component, as described above. The dispersion may further comprise at least a hydrophobing agent. Suitable hydrophobing agents provide hydrophobic effects due to their chemical nature (such as oils, fluoro compounds, polyurethanes, paraffin, wax, silicon compounds, fatty acid salts, polyaluminum chloride and fatty acids) or develop hydrophobic effects by chemical reactions after their application to the precursor. The latter hydrophobing agents may be silanes or water soluble silicates (e.g. water glass), aluminates (e.g. Na[Al(OH)$_4$], etc.) or isocyanates which may produce hydrophobic effects, e.g. after heat treatment or catalytic conversion.

The dispersion may contain 0.1-70 wt.-%, preferably 5-50 wt.-%, more preferably 10-40 wt.-%, even more preferably 0.1 to 1 wt.-%, of modified layered silicate, based on the overall dispersion. If present, the dispersion may contain 0.1-2 wt.-% of the fibrous component, preferably 0.1-0.2 wt.-%, based on the total mass of the dispersion. Subsequently, the dispersion obtained in step (a) is applied onto a surface. The surface is configured such that it particularly provides for a planar or three-dimensional casting, such as a film structure, honeycomb-like structure, a corrugated structure, a trapezial corrugated structure, pyramid-shaped structure, spherical structure, perpendicular spiral-shaped structure or grid-like structure. In case of a film, this is preferably about 0.002-1 mm, more preferably 0.06-0.25 mm, thick.

In another embodiment, the casting may also comprise a member, onto the surface of which the dispersion obtained in step (a) was applied. Thus, the process also includes the coating of such member with a dispersion obtained in step (a). The member may be in the form of a spatial structure as described above. It may be made of paper, plastics, metal foils, inorganic fibers, such as glass fiber, and wovens or non-wovens made thereof, particularly from a material that decomposes under certain conditions, such as thermal or chemical treatment. In a preferred embodiment, the member decomposes under the conditions applied during the treatment for the preparation of the insulation panel (see below).

In step (c), the at least one solvent is at least partially removed at increased temperatures and/or reduced pressure to form a solid casting. Preferably, the at least one solvent is at least partially removed at a temperature of −100 to +95° C., preferably 20-80° C., more preferably 25-60° C. Suitable pressures for at least partially removing the at least one solvent range from 0 to 1000 mbar, preferably 10-800 mbar.

After step (d), the obtained casting preferably contains less than 10 wt.-% of solvent, more preferably less than 7 wt.-% of solvent, even more preferably from 0.2 to 7 wt.-% of solvent, based on the total weight of the casting.

The casting obtained after step (d) may have a modulus of 1,000-5,000 MPa determined via DIN EN ISO 1924.

If the casting is not already present in a spatial structure as described above, a further step (e) follows to form a spatial structure from the casting. The spatial structure may be formed by stamping, embossing, folding, crimping or pressing. In order to provide spatial structures as characterized above, the casting may also be formed to a spatial structure by linking the (potentially two-dimensional) casting, optionally with other castings, using an inorganic adhesive. This way, e.g. films can be processed to three-dimensional spatial structures, such as corrugated cardboard or honeycomb-like structures. Corrugated cardboard may be formed by fixing a corrugated film structure between two planar films thereby obtaining a spatial structure.

In another embodiment the process for preparing an insulation panel precursor further comprises the steps (f) introducing at least one gas, such as air, or inert gas, such as nitrogen, carbon dioxide, helium, neon or argon and/or a foamed inorganic and/or organic insulation material, such as vermiculite foam, silicate foam, sulfate foam, or high-performance polymer foam, such as polyamide-imide (PAI), polyimide (PI), polyether ether ketone (PEEK) or polybenzimidazol (PBI) foam into the cavities in the insulation panel precursor and/or the spatial structure, and (g) optionally treating the product obtained in (f) at elevated temperatures, such as 70-250° C., preferably 80-85° C.

In a preferred embodiment, the insulation panel precursor comprises, more preferably consists of, modified layered silicates. In another preferred embodiment, the insulation panel precursor consists of modified layered silicates and at least one fibrous component, as described above.

In a further aspect, the present invention relates to an insulation panel precursor obtainable by a process as described above.

The insulation panel precursor can easily be processed to provide desired structures due to the flexibility of the castings. However, the insulation panel precursor usually has only limited water resistance properties. Water resistance properties of the castings may be improved by subjecting the casting to a subsequent treatment.

The insulation panel precursor may preferably be treated by applying a hydrophobing agent to the insulation panel precursor. Suitable hydrophobing agents provide hydrophobic effects due to their chemical nature (such as oils, fluoro compounds, polyurethanes, paraffin, wax, silicon compounds, fatty acid salts, polyaluminum chloride and fatty acids) or develop hydrophobic effects by chemical reactions after their application to the precursor. The latter hydrophobing agents may be silanes or water soluble silicates (e.g. water glass), aluminates (e.g. $Na[Al(OH)_4]$, etc.) or isocyanates which may produce hydrophobic effects, e.g. after heat treatment or catalytic conversion. The hydrophobic agent may be applied by conventional methods, such as spraying, dipping, roll-coating, or in a steam chamber.

Thus, in a further aspect, the present invention relates to an insulation panel made from the insulation panel precursor. The insulation panel is obtainable by a process comprising the steps (A) providing an insulation panel precursor as described above and (B) treating the insulation panel precursor at temperatures above 100° C., preferably from above 180° C. to about 1,000° C., more particularly between 180 and 280° C.

In another preferred embodiment, the insulation panel itself may be treated by any hydrophobing agent as explained above after step (B).

Usually, the insulation panel maintains the spatial arrangement that is essentially the same, or preferably the same, spatial structure of the insulation panel precursor. The skilled person will be aware that during treating step (B) the spatial structure of the insulation panel precursor may be slightly changed. However, it is preferred that the macroscopic arrangement (e.g. the corrugated film, honeycomb-like structure, trapezial-corrugated structure, etc.) of the precursor is essentially maintained in the insulation panel.

The insulation panel is preferably self-supporting, i.e. it can withstand loads of $1 \times 10^5$-$5 \times 10^7$ $N/m^2$ in at least one direction of the panel (DIN EN ISO 3386-1).

The insulation panel preferably has a heat conductance of between 0.01 and 0.07 W/mK, more preferably 0.02-0.07 W/mK.

The insulation panel of the invention particularly has the advantage that it is made from inorganic material and is thus non-inflammable. On the other hand, the heat treatment of the insulation panel precursor makes the insulation panel water-resistant. Water resistance in the sense of the present invention is defined in that the insulation panel when dipped in distilled water at 20° C. for 2, preferably 6, months does not solve, i.e. maintains its original dry mass.

Non-inflammability in the sense of the present invention is defined in that it is non-inflammable according to DIN 4102 (class A1 or A2, preferably A1), or the more recent DIN EN 13501-1.

In a preferred embodiment, the insulation panel comprises, more preferably consists of, layered silicates and optionally modified layered silicates. In another preferred embodiment, the insulation panel consists of layered silicates and optionally modified layered silicates and at least one fibrous component, as described above.

In a further aspect, the invention relates to an insulation panel system comprising at least one insulation panel of the invention. For example, the insulation panel system may comprise at least two insulation panels which are interconnected, e.g. by using inorganic adhesives. The insulation panel system may also be a structure comprising at least one insulation panel sandwiched between two load-bearing elements. The load-bearing elements may be fire resistant or sound resistant boards having a higher mechanical strength than the insulation panel.

In a further aspect, the present invention relates to the use of an insulation panel precursor as described above for the manufacture of an insulation panel.

In another aspect, modified layered silicates as described above may be used for the preparation of insulation panels and insulation panel precursors of the invention.

The insulation panel and the insulation panel system of the invention may be used as a light-weight element.

The insulation panel and the insulation panel system of the invention may also be used for the absorption of heat and/or sound.

The present invention is illustrated by the following examples.

EXAMPLE 1

1.1 Preparation of the Modified Layered Silicate 750 g of vermiculite and 1,250 g of aqueous saturated sodium chloride solution are mechanically stirred at 70° C. for 30 min in a reactor. The suspension is filtered and washed with distilled water until the conductivity of the washing water reaches about 2 mS/cm. The resulting slurry is treated the same way with 1,250 ml of an aqueous 2 M butylammoniumchloride solution. The suspension is filtered and washed with distilled water.

1.2 Preparation of the Dispersion of Modified Layered Silicates

After washing, a slurry of the modified vermiculite is allowed to swell for 3 to 24 hours. The modified vermiculite slurry is diluted in water to about 10 wt.-% and treated with a high shear mixing apparatus like ULTRA-TURRAX®.

1.3 Preparation of the Insulation Panel Precursor

The dispersion is poured onto a flat polyethylene or polypropylene surface and dried at room temperature under atmospheric pressure. The obtained film is removed and subjected to a corrugating roll, thereby creating a wave pattern having a total height of 0.25 cm. The wave peaks are treated with a silicate adhesive and interdisposed between two planar films. This process is repeated to obtain a desired thickness of 2 cm.

Before gluing the wave troughs, one or both sides may be filled with aqueous vermiculite foam obtained by treating a 10 to 20 wt.-% aqueous dispersion of vermiculite in a planetary mixer. The foam is filled into the wave troughs and the excess foam is discarded.

1.4 Preparation of the Insulation Panel

The obtained insulation panel precursor is put into an oven for 1 hour at 200° C. In a second step, the oven is heated with a rate of 5° C./min until 350° C. are reached.

EXAMPLE 2

2.1 Preparation of the Modified Layered Silicate 750 g of vermiculite (grade superfine or micron) and 1,250 g of aqueous saturated sodium chloride solution are mechanically stirred (four pitched blade impellers, distributed over 4 stages) at 70° C. for 30 min in a reactor. The suspension is cooled to room temperature, filtered and washed with purified water until the conductivity of the washing water reaches about 0.1-2 mS/cm. The mixture is centrifuged (10,000 rpm, 5 min) and water is discarded. The obtained product is treated with 1,250 ml of an aqueous 2 M butylammoniumchloride solution (80 mS/cm). The suspension is diluted with purified water (4 l), filtered and washed with purified water. When the washing water reaches the conductivity range of 1 to 4 mS/cm, the suspension (overall volume 5 l) is allowed to swell for 0.5 to 24 hours in water and washing will be continued until a conductivity of 0.1 mS/cm is reached.

2.2 Preparation of the Dispersion of Modified Layered Silicates

After washing, the suspension of the modified vermiculite obtained above is allowed to swell for 3 to 24 hours. The modified vermiculite suspension is diluted in water to about 10 wt.-% and treated with a high shear mixing apparatus (ULTRA-TURRAX®). The mixture is allowed to settle overnight and the sediment (containing contaminants like quartz, magnetite, etc.) is separated by decanting, thereby forming the dispersion of the invention.

2.3 Preparation of Vermiculite Films 200 g of the above dispersion is diluted with distilled water to a concentration of 5 to 7 wt.-% and poured onto a flat polyethylene or polypropylene surface with a lateral boundary (approx. DIN A4) and dried at room temperature for 1-2 days. The obtained vermiculite film is removed from the substrate. For example, the grammage of a 0.10 mm thick film is 197 g/m$^2$, a 0.18 mm thick film has 295 g/m$^2$. A fire test is performed with a commercial lighter (BIC). The obtained vermiculite films are non-inflammable, show no visible spread of heat after heat removal (visible by color change from yellow to anthracite) and show almost no smoke emission.

2.4 Preparation of Insulation Panel Precursors and Insulation Panels

Vermiculite films (0.10-0.18 mm thickness) obtained above were subjected to a corrugating process with round aluminium bars (3 mm), thereby creating a wave pattern having a total height of 2.3 mm. The corrugated films were cut to 100×100 mm pieces. The corrugated films are interdisposed between two planar films which are previously coated by an aqueous sodium silicate adhesive (35%, Carl Roth) using a paint brush. The sandwich structure is pressed under mild mechanical pressure for fixation. Another corrugated and planar films are alternatingly adhered to the sandwich structure to give a precursor system having the structure "planar film-corrugated film-planar film-corrugated film—etc." such that overall heights of 7 and 20 mm, respectively, are obtained.

The insulation panel precursor #1 was made waterproof according to the waterproofing method a) by a final treatment at 250° C. as described under section 2.5 a).

The insulation panel precursor #4 was filled with aqueous vermiculite foam. The vermiculite foam is obtained by treating 140 g of an aqueous dispersion of organically modified vermiculite (micron grade; 8 wt.-%) in a commercial planetary mixer for 3 min. The foam is filled into the wave troughs of the corrugated film and dried at 80° C. After drying, the other side of the sample is analogously filled with foam to form a completely foam-filled sample. The sample is glued with waterglass between two planar films and mechanically pressed to obtain insulation panel precursor #4. Samples having an overall height of 7 and 20 mm, respectively, can be obtained by the method as described above.

The insulation panel precursors have been subjected to a final heat treatment at 100-120° C. for 10 min, thereby obtaining the insulation panels (see Table 1).

TABLE 1

Insulation panels

| insulation panel # | corrugated films (number) | thickness (mm) | size (mm × mm) | foam | waterproof treatment |
|---|---|---|---|---|---|
| 1 | 3 | 7 | 100 × 100 | no | yes |
| 2 | 3 | 7 | 100 × 100 | no | no |
| 3 | 7 | 20 | 100 × 100 | no | no |
| 4 | 7 | 20 | 100 × 100 | yes | no |

Heat Impact on Insulation Panels

The insulation panels have been fixed within a frame (RIGIDUR H plates building material class A1, 10 mm thick), such that an area of 100 mm×100 mm is freely accessible. Two plates of Rigidur each having a hole of 80 mm×80 mm are glued by Promat K 84 fireproof glue on each side of the frame, such that an area of 80 mm×80 mm of the insulation panel is freely accessible from both sides. A temperature sensor is glued by water glass in the centre of the freely accessible area of the insulation panel. This construct (overall five Rigidur plates) is used to completely close a programmable oven (Nabertherm L5/S) such that the freely accessible area of the insulation panel is centered within the cross-section of the oven. The temperature sensor is located on the outer side of the oven.

The oven is heated to about 1,000° C. within 100 min. The temperature profiles are shown in FIG. 1 and FIG. 2, respectively.

In FIG. 1, the outer temperature of the 7 mm thick insulation panels #1 and #2 and the corresponding oven curves are shown. Sample #1 shows slightly better insulation properties. Both samples maintain their three dimensional structure after heat treatment.

Figure 2:
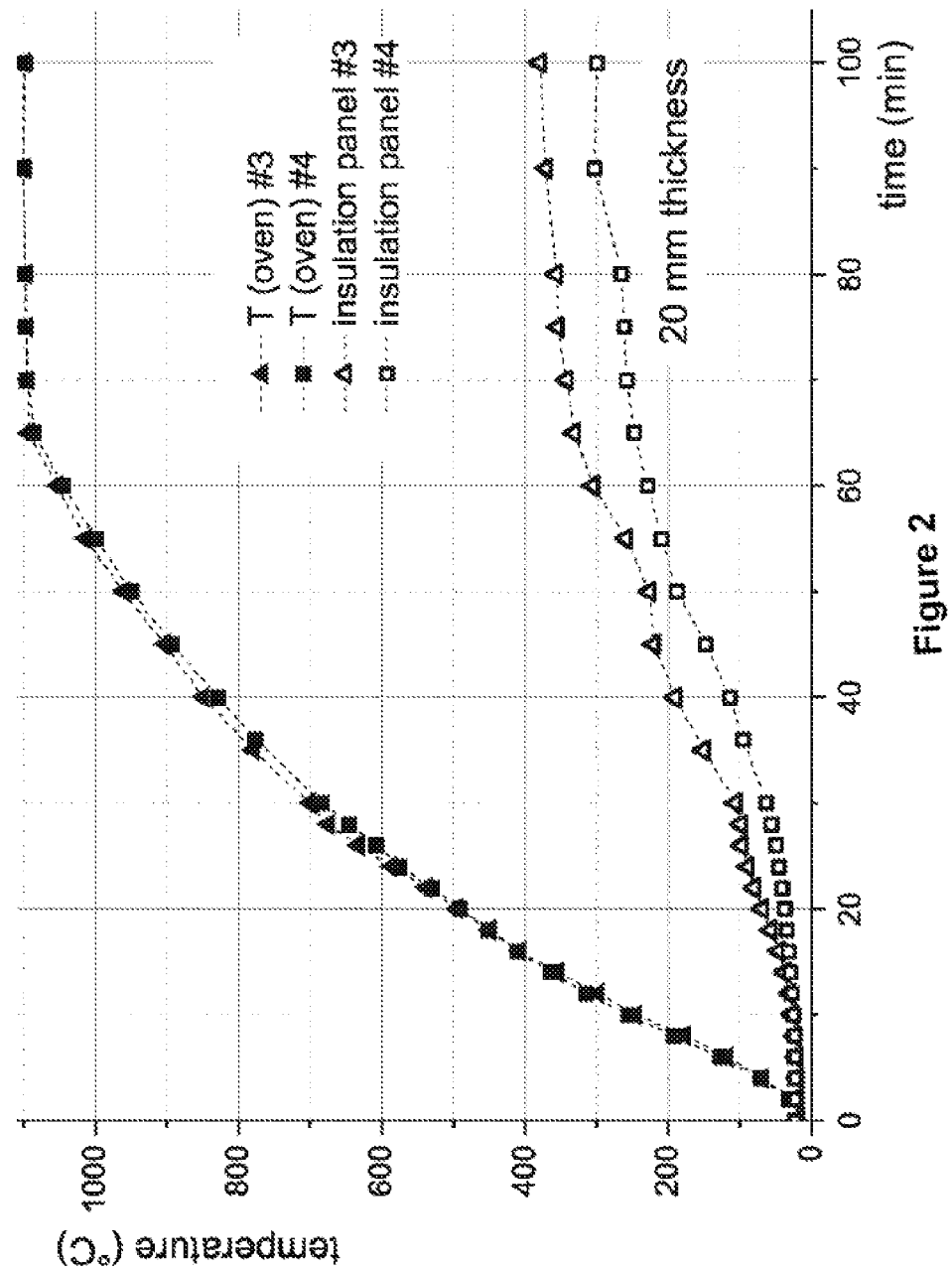
FIG. 2 depicts a temperature profile in the oven of the 20 mm thick insulation panels No. 3 and 4.

In FIG. 2, the outer temperature of the 20 mm thick insulation panels #3 and #4 and the corresponding oven curves are shown. Sample #4 shows significantly improved insulation properties. Both samples maintain their three dimensional structure after heat treatment.

Thus, most promising results are obtained with 20 mm foamed insulation panels.

Figure 3:
FIG. 3 depicts a photograph of two samples heat treated at 250° C. and 300° C. that are water-resistant for more than 2 years.

2.5 Preparation of Waterproof Vermiculite Films a) The films obtained in section 2.3 are dried at 80° C. for 24 hours, and subsequently treated at 110° C. for 1 hour and at 130° C. for 1 hour. Subsequently, the preheated films were subjected to a final treatment at 200° C., 250° C. or 300° C. for 20 hours. The obtained films are placed into water at room temperature. The sample subjected to a 200° C. treatment is instable in water, while the other two samples (250° C. and 300° C.) are water-resistant for more than 2 years (see FIG. 3).

b) Five films (30×15 mm) obtained in section 2.3 were pretreated according to method a) and finally treated at 150° C. for 20 hours. Five films obtained according to section 2.3 serve as a reference. Each sample has been dipped for 1 minute in one of five different concentrations of waterproofing agent (100 g) of i) pure methyltrimethoxysilane (MTMS), ii) 25 wt.-% MTMS in technical ethanol, iii) 50 wt.-% MTMS in technical ethanol, iv) 75 wt.-% MTMS in technical ethanol and v) technical ethanol). Subsequently, the films were dried at 80° C. for 30 minutes and at 110° C. for 60 minutes. All samples were stored in water at room temperature for 24 hours. After 24 hours, the films in the bottles were shaken and immediately photographed.

Figure 4:
FIGS. 4A and 4B depict pretreated samples (FIG. 4A) with IVITMS concentrations of 50 wt.-% and 75 wt.-% that are not reds ersible redispersible.

As can be seen from FIG. 4, the pretreated samples (FIG. 4A) with MTMS concentrations of 50 wt.-% and 75 wt.-% are not redispersible (translucent water phase). These samples are therefore waterproof. All films dipped in 0, 25 and 100 wt.-% of MTMS are redispersible (opaque and birefringent dispersion). All reference samples (FIG. 4B) are redispersible, while treatment with 50 wt.-% and 75 wt.-% of MTMS are most resistant to water.

2.6 Preparation of Waterproof and Fireproof Insulation Panels

The preparation of waterproof and fireproof insulation panels was conducted using miniature samples (30×30 mm) of the insulation panels #2, #3, #4 which are treated by the waterproofing method according to Example 2.5 b) (iii). The obtained insulation panels have the same spatial arrangement (including the foamed structure) after the hydrophobing treatment A fire test is performed with a commercial lighter (BIC). The obtained insulation panels are non-inflammable, show no visible spread of heat after heat removal (visible by color change from yellow to anthracite) and show almost no smoke emission.

EXAMPLE 3

3.1 Preparation of the Modified Layered Silicate

See Example 2.1

3.2 Preparation of the Dispersion of Modified Layered Silicates

The preparation of the dispersion is carried out according to Example 2.2 including an additional final step, wherein the dispersion of the invention is centrifuged at least one time at 10,000 rpm for 25 minutes to obtain a paste. The resulting paste has a solid content of 18 wt.-%. The solid content of the paste is obtained by drying until a constant mass is measured (e.g. 0.5 g, 130° C., 45 min).

3.3 Preparation of Fireproof Vermiculite/Cellulose Composite Films 100 g of the obtained paste (18 wt.-%) is dispersed in 8,900 g tap water with an ULTRA-TURRAX® for 60 seconds (5,000 rpm) to a stock dispersion. The stock dispersion is mixed with 0.1 wt.-% NBSK cellulose fiber pulp in a ratio as indicated in Table 2. The solid content of the cellulose fiber pulp is obtained by filtering and drying the fibers on filter paper until a constant mass is measured (e.g. 100 ml, 105° C., 1 h).

The compositions indicated in Table 2 are added to a Rapid-Köthen papermaking machine (diameter 20 cm; 200 mesh, based on DIN 5269-2) which is filled with 4 l of tap water. Another 7 l are added. A wet film is formed by filtering the composition under reduced pressure (27 kPa). The wet film is removed by a carrying carton and dried within a carrying carton sandwich in a Rapid-Köthen drier (90° C., 800 mbar, 10 minutes). A single vermiculite/cellulose composite film (dry film) is obtained after removal from the cartons.

TABLE 2

Vermiculite/cellulose composite films

| # | grammage (g/m$^2$) | stock dispersion (g) | fiber pulp (g) | dry film composition fiber content (wt.-%) | fire test (OK/failed) |
|---|---|---|---|---|---|
| 5 | 60 | 905 | 70 | 4% | OK |
| 6 | 60 | 885 | 110 | 6% | OK |
| 7 | 60 | 865 | 150 | 8% | OK |
| 8 | 60 | 850 | 190 | 10% | failed |
| 9 | 80 | 1180 | 150 | 6% | OK |
| 10 | 80 | 1155 | 200 | 8% | OK |

A fire test was conducted by treating the vermiculite/cellulose composite film with a lighter (BIC). When lighting the samples, a color change is observed from yellow to grey. Color change in samples #5, 6, 7, 9 and 10 occurred locally during fire impact. After fire impact no heat spread (i.e. ongoing color change) can be observed. The composite film #8 is denoted as "failed", because the spread of heat continued after the fire impact, i.e. a color change of the film is observed even after fire impact.

The composite film #7 has a thickness of 0.02 mm. Thickness may be increased (e.g. to a thickness of 0.06 mm) by assembling multiple layers. For example, three wet films of composition #7 are adhered to a carrying carton via a couching roll. The three layers laid on top of each other are sandwiched between two carrying cartons and subsequently dried in a Rapid-Köthen drier as described above.

The obtained vermiculite/cellulose composite films have improved mechanical strength, homogeneity of surface weight and film thickness in comparison to Example 1 and 2. The films keep their shape after 24 hours in water and remain stable after shaking. The films remain even intact at 77° C. and shaking in water for at least 20 min.

3.4 Preparation of Insulation Panels

Figure 5:
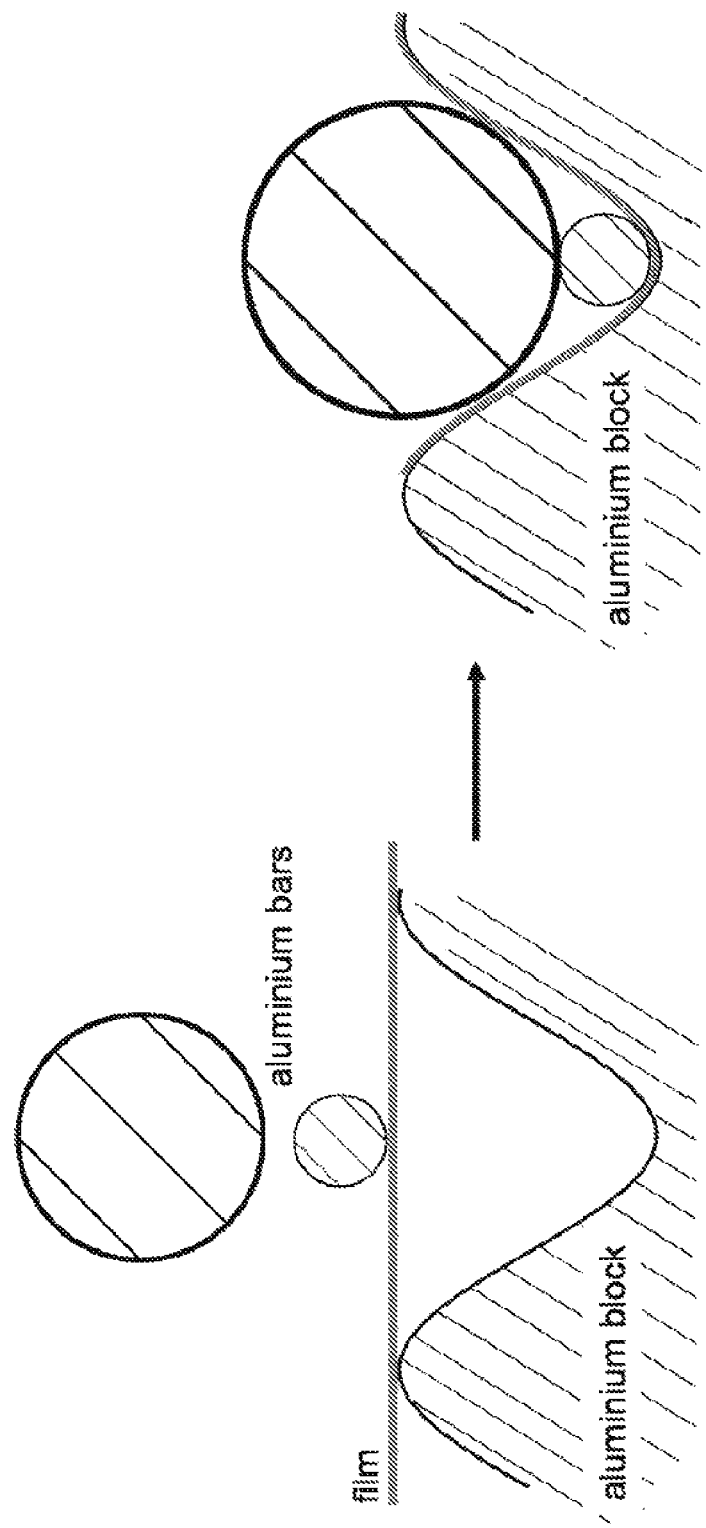
FIG. 5 depicts exemplary films formed according to the disclosure and that 150 mm. wave heiaht 7 mm. wave length 10 mm) and round aluminum bars (diameters 3 mm, length 200 rnm) that create a wave pattern having a total

Vermiculite/cellulose composite films (composition #7; film thickness 0.06 mm) were cut to angular-shaped films (130×140 mm). Subsequently, the films are subjected to a corrugation in a wave-shaped aluminum block (150×150 mm, wave height 7 mm, wave length 10 mm) and round aluminum bars (diameters 3 mm, length 200 mm) creating a wave pattern having a total height of 5 mm (see FIG. 5) The corrugated film is formed to an insulation panel #11 having a total thickness of 17 mm (4 corrugated and 5 planar films) according to Example 2.4.

For the preparation of insulation panel #12, all wave troughs of the corrugated film are filled with vermiculite foam as described under item 2.4 (see Table 3).

The adhesion between waterglass and the composite films is significantly improved as compared to Examples 1 and 2. The obtained insulation panel precursors are subjected to a final heat treatment at 100-120° C. for 10 min, thereby forming the insulation panels (see Table 3).

TABLE 3

Insulation Panels according to Example 3

| insulation panel # | corrugated films (number) | thickness (mm) | size (mm × mm) | foam |
|---|---|---|---|---|
| 11 | 4 | 17 | 120 × 100 | no |
| 12 | 5 | 17 | 130 × 125 | yes |

Fire Impact on Insulation Panels

The fire impact on the insulation panels #11 and #12 is tested. The insulation panels have been fixed within a frame (PROMATECT-H plates building material class A1, 20 mm thick), such that an area of 120 mm×100 mm and 130×125 mm, respectively is freely accessible. One plate of PROMATECT-H having a hole of 100 mm×100 mm is glued by Promat K 84 fireproof glue on each side of the frame, such that an area of 100 mm×100 mm of the insulation panel is freely accessible from both sides. A temperature sensor is glued by water glass in the centre of the freely accessible area of the insulation panel. This construct (three PROMATECT-H plates in total) is used to cover two holes of a standardized flame facility (DIN 4102-8, "Materialprüfanstalt für das Bauwesen", Braunschweig, GER).

Figure 6:
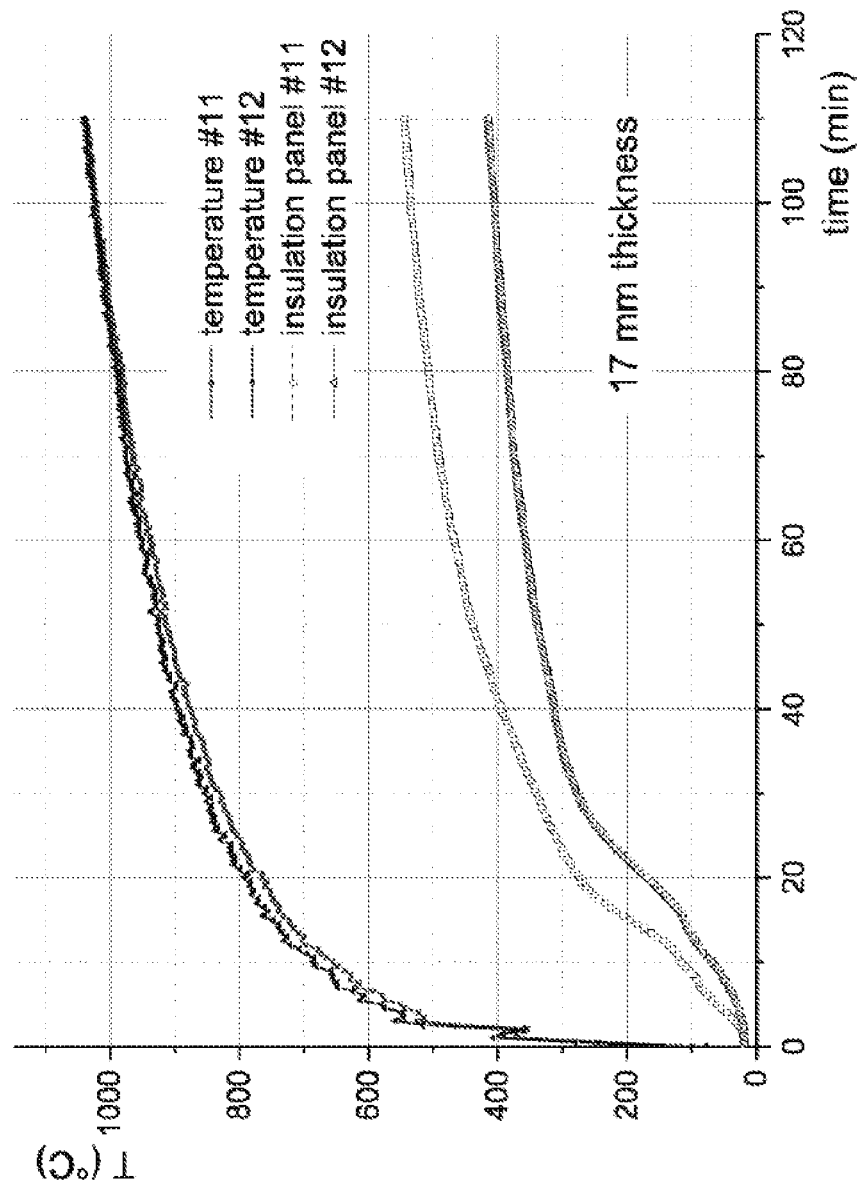
FIG. 6 depicts a standardized temperature curve that was performed, inside of the flame facility.

A standardized temperature curve was performed inside of the flame facility (see FIG. 6).

The insulation panels keep their spatial structure within the heat treatment period of about 110 minutes. No transmission of the flame is observed during the measurement. After 110 min. of heat treatment the foamed insulation panel #12 has better insulation properties than insulation panel #11 which can be seen by a surface temperature which is lowered by approx. 130° C. as compared with the surface temperature of panel #11.

The present invention particularly relates to the following items:

1. Insulation panel precursor comprising at least one modified layered mineral, such as modified layered silicate or layered double hydroxide and optionally at least one fibrous component.
2. Insulation panel precursor according to item 1, wherein the insulation panel precursor comprises at least one spatial structure, particularly a spatial structure with at least one two-dimensional unit.
3. Insulation panel precursor according to item 2, wherein the two-dimensional unit is a film or a stick.
4. Insulation panel precursor according to any of items 2 or 3, wherein the two-dimensional unit is interconnected with an adhesive, such as an inorganic adhesive, to form a spatial structure.
5. Insulation panel precursor according to any of items 2-4, wherein the spatial structure is in the form of a corrugated film, honeycomb-like, trapezial-corrugated, perpendicular spiral-shaped, grid-like, pyramid-shaped or spherical structure.
6. Insulation panel precursor according to any of items 2-6, wherein the spatial structure has a thickness of about 1 mm to 20 cm, preferably from 0.5 cm to 15 cm.
7. Insulation panel precursor according to any of items 1-7, wherein the insulation panel precursor and/or the spatial structure includes cavities that are in particular regularly distributed within the insulation panel precursor and/or the spatial structure.
8. Insulation panel precursor according to item 7, wherein the cavities are filled with at least one gas, such as air, inert gas, such as nitrogen, carbon dioxide, helium, neon or argon, and/or with a foamed inorganic and/or organic insulation material, such as vermiculite foam, silicate foam, sulfate foam or high-performance polymer foams, such as polyamide imide (PAI), polyimide (PI), polyether ether ketone (PEEK) or polybenzimidazole (PBI) foam.
9. Insulation panel precursor according to any of items 7 or 8, wherein the cavities are at least partially vacuumized.
10. Insulation panel precursor according to any of items 1-9, which comprises a plurality of different or equal spatial structures.
11. Insulation panel precursor according to any of items 1-10, wherein the spatial structure is formed from modified layered minerals, such as layered silicates or layered double hydroxides.
12. Insulation panel precursor according to any of items 1-11, wherein the layered silicate is at least one phyllosilicate.
13. Insulation panel precursor according to any of items 1-12, wherein the phyllosilicate is selected from bentonite, clay, mica, serpentine or smectite.
14. Insulation panel precursor according to any of items 12 or 13, wherein the phyllosilicate is selected from vermiculite, montmorillonite, kaolinite, illite or muscovite.
15. Insulation panel precursor according to any of items 1-14, wherein the modified layered silicate is organically and/or inorganically, particularly organically, modified.
16. Insulation panel precursor according to any of items 1-15, wherein the original interlayer cations or anions of the layered silicates are replaced by organocations, organoanions, inorganic cations or inorganic anions other than the original interlayer cations or anions.
17. Insulation panel precursor according to any of items 1-16, wherein the original interlayer cations of the layered silicates are replaced by organocations, such as organic ammonium or phosphonium ions.
18. Process of preparing an insulation panel precursor according to any of items 1-17, comprising the following steps:
    (a) providing a dispersion comprising at least one modified layered silicate in at least one solvent,
    (b) applying the dispersion obtained in step (a) onto a surface,
    (c) at least partially removing the at least one solvent at temperatures of about −100 to +95° C. and/or reduced pressure to form a casting,
    (d) taking the casting obtained after step (c) and
    (e) optionally forming a spatial structure from the casting obtained after step (d).
19. Process according to item 18, wherein the solvent is selected from the group consisting of water, alkanols, ketons, ester, ether, butylacetate, 2-butanon, butyl glycole or mixtures thereof.
20. Process according to any of items 18 or 19, wherein the at least one modified layered silicate is homogenized in the at least one solvent using shearing forces, e.g. using ULTRA-TURRAX®, a pulper, a mixer or suitable mills.
21. Process according to any of items 18-20, wherein the dispersion contains 0.1-70 wt.-% of modified layered silicate based on the overall dispersion.
22. Process according to any of items 18-21, wherein the surface provides for a planar or three-dimensional casting, such as a film structure, a honeycomb-like structure, corrugated, trapezial-corrugated, pyramid-shaped, spherical, perpendicular spiral-shaped or grid-like structure.
23. Process according to any of items 18-22, wherein the at least one solvent is at least partially removed at a temperature of 20-80° C.
24. Process according to any of items 18-23, wherein the at least one solvent is at least partially removed at pressures from 0 to 1,000 mbar, preferably 10 to 800 mbar.
25. Process according to any of items 18-24, wherein the casting obtained after step (d) contains less than 10 wt.-% of solvent.
26. Process according to any of items 18-25, wherein the casting obtained after step (d) has a modulus of 1,000-5,000 MPa determined according to DIN EN ISO 1924.
27. Process according to any of items 18-26, wherein the casting is formed to a spatial structure using an inorganic adhesive.
28. Insulation panel precursor obtainable by a process according to any of items 18-27.
29. Insulation panel obtainable by a process comprising the steps:
    (A) providing an insulation panel precursor according to any of items 1-17 or 28 and
    (B) treating the insulation panel precursor at temperatures of above 100° C., particularly between 180 and 1,000° C.
30. Insulation panel according to item 29, which has a heat conductance of between 0.01 and 0.07 W/mK.
31. Insulation panel according to any of items 29 or 30, which is self-supporting.
32. Insulation panel according to any of items 29-31, which is non-inflammable and/or water-resistant.
33. Insulation panel according to any of items 29-32, which has essentially the same, preferably the same, spatial arrangement as the insulation panel precursor.
34. Insulation panel system comprising at least one insulation panel according to any of items 29-33.
35. Use of the insulation panel precursor according to any of items 1-17 or 28 for the manufacture of an insulation panel.
36. Use of modified layered silicates for the preparation of insulation panel precursors according to any of items 1-17 or 28 and/or insulation panels according to any of items 29-33.
37. Use of the insulation panel according to any of items 29-33 or the insulation panel system according to item 34 as a lightweight element.
38. Use of the insulation panel according to any of items 29-33 or the insulation panel system according to item 34 for the absorption of heat and/or fire protection and/or sound, preferably for the absorption of heat and/or fire protection.

39. Process according to any of claims 18-27, wherein the dispersion further comprises at least one fibrous component, such as a polyethylene, polypropylene, polyvinyl alcohol, viscose, carbon, glass or mineral fiber, carbon nanotube, cellulose, cotton, bamboo, hemp, wool or silk fiber, preferably a cellulose fiber.

40. Process according to any of claims 18-27 and 39, further comprising the step
   (f) introducing at least one gas, such as air, or inert gas, such as nitrogen, carbon dioxide, helium, neon or argon and/or a foamed inorganic and/or organic insulation material, such as vermiculite foam, silicate foam, sulfate foam, or high-performance polymer foam, such as polyamide-imide (PAI), polyimide (PI), polyether ether ketone (PEEK) or polybenzimidazol (PBI) foam into the cavities in the insulation panel precursor and/or the spatial structure, and
   (g) optionally treating the product obtained in (f) at elevated temperatures, such as 70-250° C.

41. Process according to any of items 18-27 and 39-40 further comprising a step
   (h) subjecting the product obtained in step (d), (e), (f) or (g) to a hydrophobing treatment.

42. Insulation panel obtainable by a process according to any of items 29-33 further comprising the step
   (C) subjecting the product obtained in step (B) to a hydrophobing treatment.

The invention claimed is:

1. An insulation panel precursor comprising at least one organically modified layered mineral and optionally at least one fibrous component.

2. The insulation panel precursor according to claim 1, wherein the organically modified layered mineral is an organically modified layered silicate.

3. The insulation panel precursor according to claim 1, wherein the insulation panel precursor comprises at least one spatial structure.

4. The insulation panel precursor according to claim 3, wherein the spatial structure is in the form of a corrugated film, honeycomb-like, trapezial-corrugated, perpendicular spiral-shaped, grid-like, pyramid-shaped or spherical structure.

5. The insulation panel precursor according to claim 3, wherein the insulation panel precursor or the spatial structure includes cavities that are distributed within the insulation panel precursor or the spatial structure.

6. The insulation panel precursor according to claim 5, wherein the cavities are filled with at least one of air, inert gas, foamed inorganic insulation material, foamed organic insulation material and high-performance polymer foam.

7. The insulation panel precursor according to claim 3 which comprises a plurality of different or equal spatial structures.

8. The insulation panel precursor according to claim 3, wherein the spatial structure is formed from modified layered minerals.

9. A process of preparing an insulation panel precursor according to claim 1 comprising the following steps:
   (a) providing a dispersion comprising at least one organically modified layered silicate in at least one solvent,
   (b) applying the dispersion obtained in step (a) onto a surface,
   (c) at least partially removing the at least one solvent at temperatures of about −100 to +95° C. and/or reduced pressure to form a casting,
   (d) optionally taking the casting obtained after step (c) to form.

10. The process according to claim 9, wherein the solvent is selected from the group consisting of water, alkanols, ketones, ester, ether, butylacetate, 2-butanone, butyl glycol and mixtures thereof.

11. The process according to claim 9, wherein the dispersion contains 0.1-70 wt.-% of organically modified layered silicate based on the overall dispersion.

12. The process according to claim 9, wherein the dispersion further comprises at least one fibrous component, such as a polyethylene, polypropylene, polyvinyl alcohol, viscose, carbon, glass or mineral fiber, carbon nanotube, cellulose, cotton, bamboo, hemp, wool or silk fiber.

13. The process according to claim 9, further comprising the step:
   (e) introducing at least one of air, inert gas, foamed inorganic insulation material, foamed organic insulation material, and high-performance polymer foam into the cavities in the insulation panel precursor or the spatial structure, and
   (f) optionally treating the product obtained in (f) at elevated temperatures.

14. The process according to claim 9 further comprising a step:
   (g) subjecting the product obtained in step (d), (e), (f) or (g) to a hydrophobing treatment.

15. An insulation panel precursor obtained by a process according to claim 9.

16. An insulation panel obtained by a process comprising the steps:
   (A) providing an insulation panel precursor according to claim 1 and
   (B) treating the insulation panel precursor at temperatures of above 100° C.

17. An insulation panel obtained by a process according to claim 16 further comprising the step
   (C) subjecting the product obtained in step (B) to a hydrophobing treatment.

18. An insulation panel system comprising at least one insulation panel according to claim 16.

19. A method of manufacturing an insulation panel comprising, utilizing the insulation panel precursor according to claim 1 for the manufacture of the insulation panel.

20. A method for preparation of insulation panel precursors according to claim 1 comprising, utilizing modified layered silicates in the preparation of the insulation panel precursors.

21. A lightweight element comprising the insulation panel according to claim 16.

22. A method comprising, utilizing the insulation panel according to claim 16 for the absorption of heat and/or sound and/or fire protection.

23. A method for preparation of insulation panels according to claim 16 comprising, utilizing modified layered silicates in the preparation of the insulation panel.

* * * * *